US008819490B2

(12) United States Patent
Li et al.

(10) Patent No.: US 8,819,490 B2
(45) Date of Patent: Aug. 26, 2014

(54) TEST EXECUTION SPANNING CLOUD AND LOCAL DEVICES

(75) Inventors: Zhuowei Li, Redmond, WA (US);
Muthu A. K. Jagannathan, Issaquah, WA (US); Dong Wei, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 13/340,703

(22) Filed: Dec. 30, 2011

(65) Prior Publication Data

US 2013/0173962 A1    Jul. 4, 2013

(51) Int. Cl.
*G06F 11/00* (2006.01)

(52) U.S. Cl.
USPC .............. 714/32; 714/38.1; 717/124

(58) Field of Classification Search
None
See application file for complete search history.

(56) References Cited

U.S. PATENT DOCUMENTS

| 2005/0034103 | A1  | 2/2005  | Volkov |
| 2005/0076195 | A1  | 4/2005  | Fuller et al. |
| 2008/0115107 | A1  | 5/2008  | Arguelles et al. |
| 2009/0300423 | A1  | 12/2009 | Ferris |
| 2010/0058108 | A1* | 3/2010  | Nammatsu et al. ............... 714/4 |
| 2010/0198960 | A1* | 8/2010  | Kirschnick et al. ........... 709/224 |
| 2011/0010691 | A1* | 1/2011  | Lu et al. .......................... 717/124 |
| 2012/0042210 | A1* | 2/2012  | Glaser et al. ................... 714/38.1 |
| 2013/0019242 | A1* | 1/2013  | Chen et al. ........................ 718/1 |

FOREIGN PATENT DOCUMENTS

WO    WO 2007038953 A1 *    4/2007    .............. G06F 11/34

OTHER PUBLICATIONS

"Cloud Testing With TestComplete", Oct. 3, 2011 [http://smartbear.com/support/articles/testcomplete/cloud-testing-with-testcomplete/].*
"Leveraging Cloud Services for Development & Testing Environments", Retrieved at <<http://www.carpathia.com/assets/files/VirtualLabWP.pdf>>, White Paper, Retrieved Date: Sep. 27, 2011, pp. 5.
Ambekar, Shradha, "Extending ANT to Cloud Environment", Retrieved at <<http://www.igatepatni.com/media/430072/Extending_ANT_to_Cloud_Environment.pdf>>, Retrieved Date: Sep. 28, 2011, pp. 5.
"Cloud Testing With TestComplete", retrieved at <http://smartbear.com/support/articles/testcomplete/cloud-testing-with-testcomplete/>, original retrieval date of document: Sep. 27, 2011, retrieval date of submitted document: Mar. 27, 2014, 7 pages.

* cited by examiner

*Primary Examiner* — Gabriel Chu
(74) *Attorney, Agent, or Firm* — Ben Tabor; David Andrews; Micky Minhas

(57) ABSTRACT

A test system for a managed cloud computing environment may have a management system that may recruit devices in the cloud and outside the cloud to perform a test on a cloud based application. Each device may execute an agent that connects the device to several cloud services for messaging, data collection, and executable code storage. The management system may identify and gather the devices, then cause the devices to execute a test by sending commands through the messaging service. The devices may access executable code for the specific tasks of a test through the code storage service, and as the devices complete tasks for the test, the devices may publish results in the data collection service. The test system enables any type of scenario to be implemented, including operations that can only be performed inside and outside the managed cloud environment.

20 Claims, 3 Drawing Sheets

TEST EXECUTION SPANNING CLOUD AND LOCAL DEVICES

BACKGROUND

Testing cloud applications presents various challenges. Cloud applications can have very high throughput and computing capacities which may exceed the simulation capabilities of a single device. Testing systems that operate within a cloud environment may not have certain functionality that may be requested to test an application.

SUMMARY

A test system for a managed cloud computing environment may have a management system that may recruit devices in the cloud and outside the cloud to perform a test on a cloud based application. Each device may execute an agent that connects the device to several cloud services for messaging, data collection, and executable code storage. The management system may identify and gather the devices, then cause the devices to execute a test by sending commands through the messaging service. The devices may access executable code for the specific tasks of a test through the code storage service, and as the devices complete tasks for the test, the devices may publish results in the data collection service. The test system enables any type of scenario to be implemented, including operations that can only be performed inside and outside the managed cloud environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
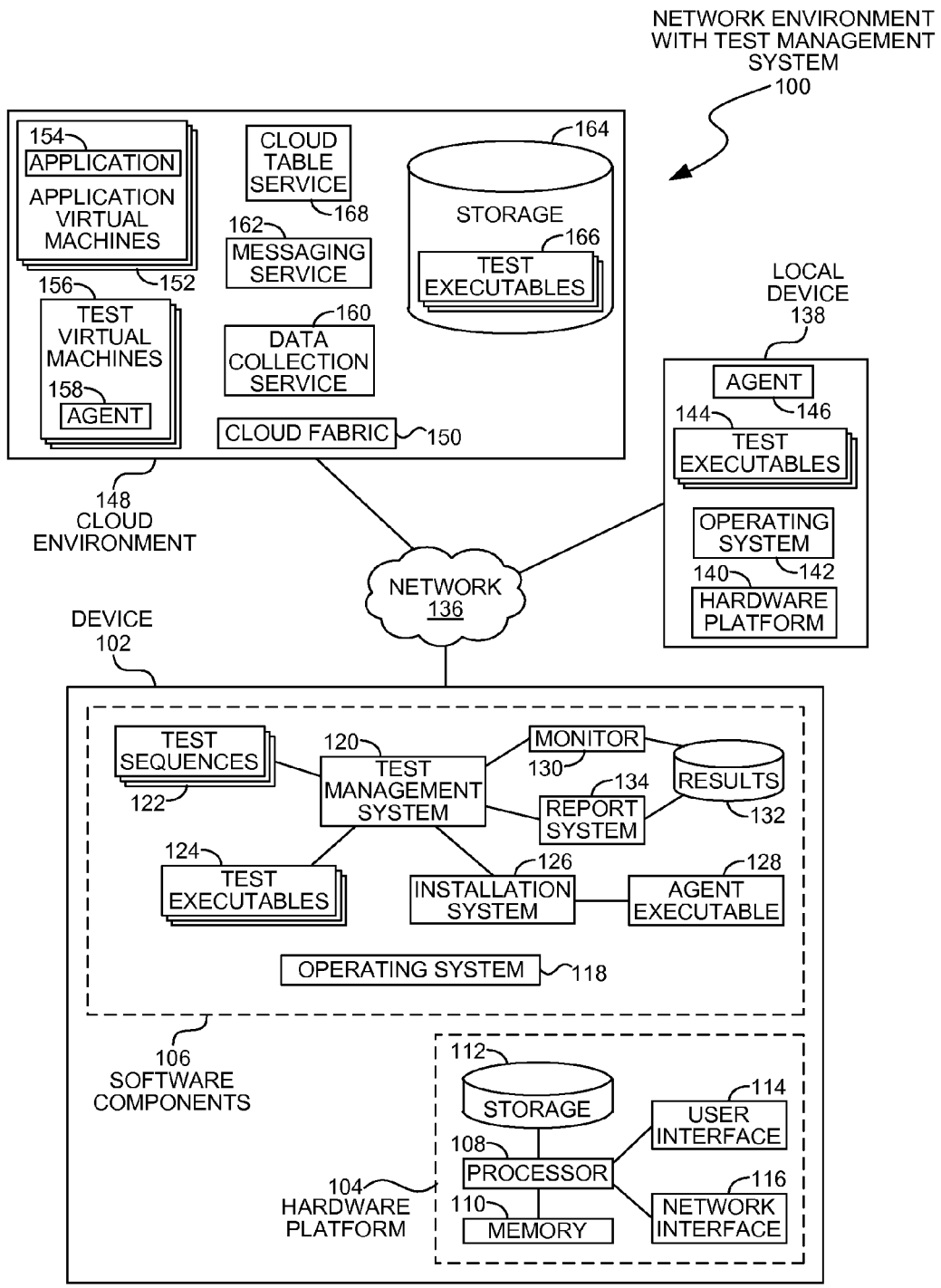
FIG. 1 is a diagram illustration of an embodiment showing a test system that may use cloud and local test devices.

Testing software in a cloud computing environment may use both local and cloud resources for executing a test suite. The local resources may perform certain functions that are not available in the cloud environment to execute a suite of tests against software executing in the cloud computing environment.

A test management system may recruit devices to perform a specific test suite. The devices may be both cloud devices, such as virtual machines, as well as local devices that are outside the cloud environment. After recruiting the devices, the test management system may deploy test executables on the various devices, coordinate the operations of the test executables, monitor the ongoing progress of the test, and collect results.

Some functions for a test suite may be performed on cloud devices, such as functions that consume high bandwidth or intensive resources. Other functions may be performed on local devices. For example, some of the management and configuration functions that may change the configuration of the devices under test may not be permitted or available to virtual machines executing in the cloud.

In one such example, a test suite may perform a stress test of a cloud application. As part of the test, a group of cloud based virtual machines may be recruited as test devices and may generate high bandwidth requests against the cloud application. During the test, a local test device may execute commands to take down or reconfigure the virtual machines on which the cloud application is executing. As the local device changes the configuration of the cloud application devices, the cloud application may be stressed from the cloud based test devices.

In such an example, the test suite may use a local test device to perform certain operations that cannot be executed by a virtual machine, such as reconfiguring the cloud environment executing the application. At the same time, virtual devices in the cloud may perform operations that cannot be executed by a local device, such as high bandwidth data transfer or high speed interaction with the cloud application.

In another example, certain tests from a secure environment into the cloud may not be available. For example, Internet Protocol (IP) address spoofing and various simulations of malware, providing secure credentials, or other operations may not be permitted by test devices that execute in the cloud. In such cases, these test functions may be performed by a local device as part of a test suite.

The test management system may coordinate the operations of each test device, both local and cloud based test devices. Each test device may have an interface that may respond to a command from a management server to begin, pause, resume, or stop the test code. The test devices may also send and receive data and other commands so that the test management system may cause all of the test devices to execute a large scale test. For example, a condition may be evaluated on one device and when that condition is reached, the test management system may cause another device to execute a test sequence.

Each test device may have a mechanism to collect data from the tests. These data may be transmitted to the test management system for evaluation, consolidation, and report creation.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which cart be used to store the desired information and may be accessed by an instruction execution system. Note that the computer-usable or computer-readable medium can be paper or other suitable medium upon which the program is printed, as the program cart be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for managing complex test operations against a cloud application. Embodiment 100 is a simplified example of a network environment in which complex tests use both cloud and local resources.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a test management system that may use both cloud and local resources to execute complex tests against a cloud application. The device 102 may operate as a management device to cause a test to be deployed across cloud resources and local resources, then schedule the test, operate the test, and collect test results.

In many cloud environments, certain functions may not be available to virtual devices within those cloud environments. For example, some configuration commands may not be accessible to virtual machines in the cloud environment, as well as security related functions, such as IP spoofing or other non-standard operations. Such commands may be available to local devices, and when such commands are used in a test scenario, a local device may be deployed to execute such commands.

Many cloud environments may have a messaging service and a data collection service. The messaging service may be a mechanism by which devices in the cloud may pass messages between each other. The test system may configure local devices with access to the messaging service so that the local devices may respond to messages transmitted by cloud devices or other local devices. The local devices may also be able to transmit messages that are received by the other test devices.

In some cases, the messaging service may be a service created and managed by a test management system. In such embodiments, a test management system may deploy a messaging service in the cloud and cause each test device to connect to the messaging system. The messaging service may then be used only by devices involved in executing a test. Other embodiments may use a general purpose messaging service that may also be used by non-test related devices.

The data collection service may collect data from each of the devices involved in a test. The data collection service may operate by receiving messages from each participating device in a test. In some embodiments, the data collection service may be a pull mechanism, where the data collection service may initiate a request for data from each device. Other embodiments may use a push mechanism where each device that has data may transmit those data to the data collection service.

In many test scenarios that operate against a cloud application, large numbers of virtual devices may be deployed in the cloud to execute test software. These test devices may produce large numbers of messages or data that may be processed by the cloud application. In some cases, the test may attempt to stress test the application to determine throughput or capacity. In some cases, many tens, hundreds, or thousands of test devices may be recruited from the cloud to execute a test.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

A test management system 120 may be an application that coordinates and executes a test suite using multiple devices, including both local and cloud resources. The test management system 120 may recruit devices to execute a test, configure those devices, and coordinate the various devices to perform the test.

The test management system 120 may have access to test sequences 122 and test executables 124. The test sequences 122 may define the sequence of operations for a test. The sequence may define a meta-level operation of a test, which may include which devices perform which functions at which time. Such operations may be performed by the test management system 120 as it oversees or controls the entire test scenario.

When the test sequences 122 define steps or operations performed by a single device, the test sequences 122 may be deployed to various devices in the test scenario and executed by those devices.

The test executables 124 may be executable code that the devices in the test scenario execute. In some embodiments, each device may execute the same test executable, while in other embodiments different devices may execute different test executables.

The test management system 120 may recruit various devices to perform a test. After identifying the devices, an installation system 126 may cause an agent executable 128 to be installed and begin executing on the test devices. The agent executable 128 may connect the test device to a messaging service 162 and data collection service 160 that may execute in the cloud environment 148.

In some embodiments, the agent may download and execute the test sequences 122 and test executables 124. In some embodiments, the test sequences 122 and test executables 124 may be stored in a cloud storage 164 as the test executables 166. In such embodiments, the agents may download the appropriate test executables from the test executables 166.

As a test is being performed, a monitor 130 may collect status information and test results from the various test devices. The monitor 130 may store the results 132 in a database, which may be analyzed by a report system 134 to generate reports at the end of the test or while the test is in progress.

The device 102 may be connected to a network 136, along with local devices 138 and a cloud environment 148. The network 136 may include both local area networks and wide area networks such as the Internet. In some cases, the local device 138 may be connected to the device 102 by a local area network connection, while the cloud environment 148 may be connected using a wide area network connection.

The local device 138 may be a server, personal computer, or other hardware device that performs some of the test operations. The local device 138 may, have a hardware platform 140 on which an operating system 142 may execute. When configured to perform as part of a test scenario, the local device 138 may have an agent 146 and test executables 144. The agent 146 may connect the local device 138 to a messaging service 162 to participate in the test scenario.

The cloud environment 148 may operate on a cloud fabric 150, which may be a large collection of processors and other hardware components. In many embodiments, the cloud fabric 150 may support multiple virtual machines using multiple server computers. In a typical embodiment, the cloud fabric 150 may be housed in a datacenter.

A set of application virtual machines 152 may execute an application 154 that may be tested by the test management system 120. The application 154 may consist of a single set of executables that are executed in parallel on multiple application virtual machines 152. Other embodiments may have different executables that operate on various application virtual machines 152 to deliver a single application.

The test virtual machines 156 may execute test executables that exercise the application virtual machines 152. The test virtual machines 156 may have an agent 158 which may connect to the data collection service 160 and the messaging service 162 to collect test status and results and communicate with other test devices.

Many cloud environments may contain cloud storage 164. The cloud storage 164 may contain a copy of the test executables 166 which may be downloaded and executed by the various test virtual machines 156 as well as the local device 138.

A cloud table service 168 may be a management service that collects at least a minimal status for each device executing a test application. Each device may send an update periodically that indicates that the device is functioning properly. In some embodiments, the cloud table service 168 may collect performance data, such as load metrics or other performance information that may be used to assess the status of the devices.

Figure 2:
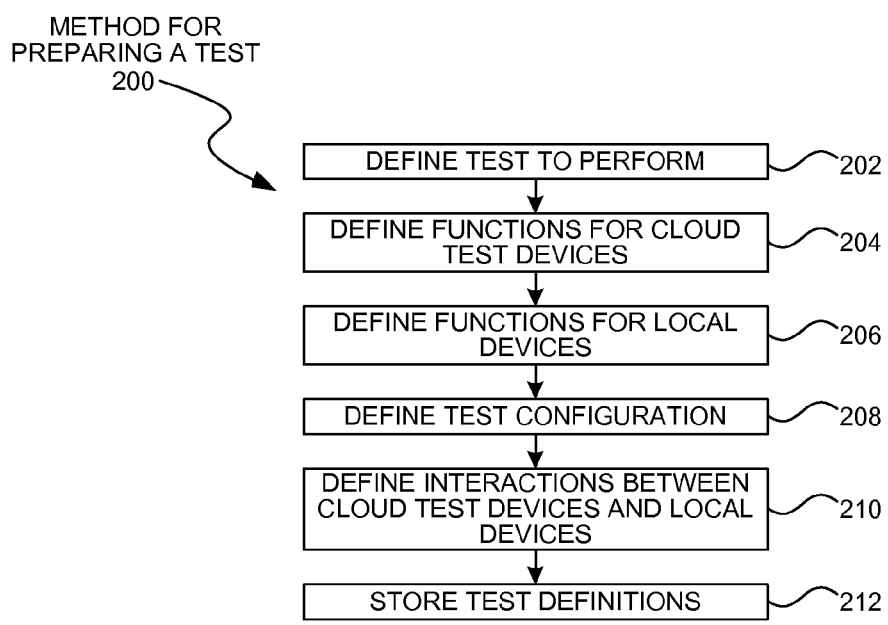
FIG. 2 is a flowchart illustration of an embodiment showing a method for creating a test definition.

FIG. 2 is a flowchart illustration of an embodiment 200 showing a method for preparing a test. The process of embodiment 200 is a simplified example of one method that may define a test to be performed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one process for creating a test. The test may involve both local and cloud resources, and may be used to exercise a cloud application.

In block 202, a test to be performed is defined. The definition in block 202 may include the overall objectives of the test along with the high level sequence of events and data to be collected.

The test may be further defined in block 204 by defining functions a may be performed by the cloud test devices. The cloud test devices may be virtual machines in a cloud environment and may perform test operations that may be difficult to perform using non-cloud devices. Such operations or functions may, for example, generate large amounts of data that takes advantage of the large processing power and communications bandwidth of cloud devices.

The test may be further defined in block 206 by defining functions that may be performed by the local devices. The local devices may have additional capabilities that are not permitted by cloud devices. For example, the local devices may be capable of reconfiguring cloud devices or performing functions that may be disallowed for security purposes, such as IP spoofing.

The overall test configuration or sequence may be defined in block 206, and the interactions between cloud test devices and local devices may be defined in block 208. The definitions created in blocks 206 and 208 may include both the high level and low level sequencing of various steps and interactions of a test suite.

The entire test definition may be stored in block 212.

Figure 3:
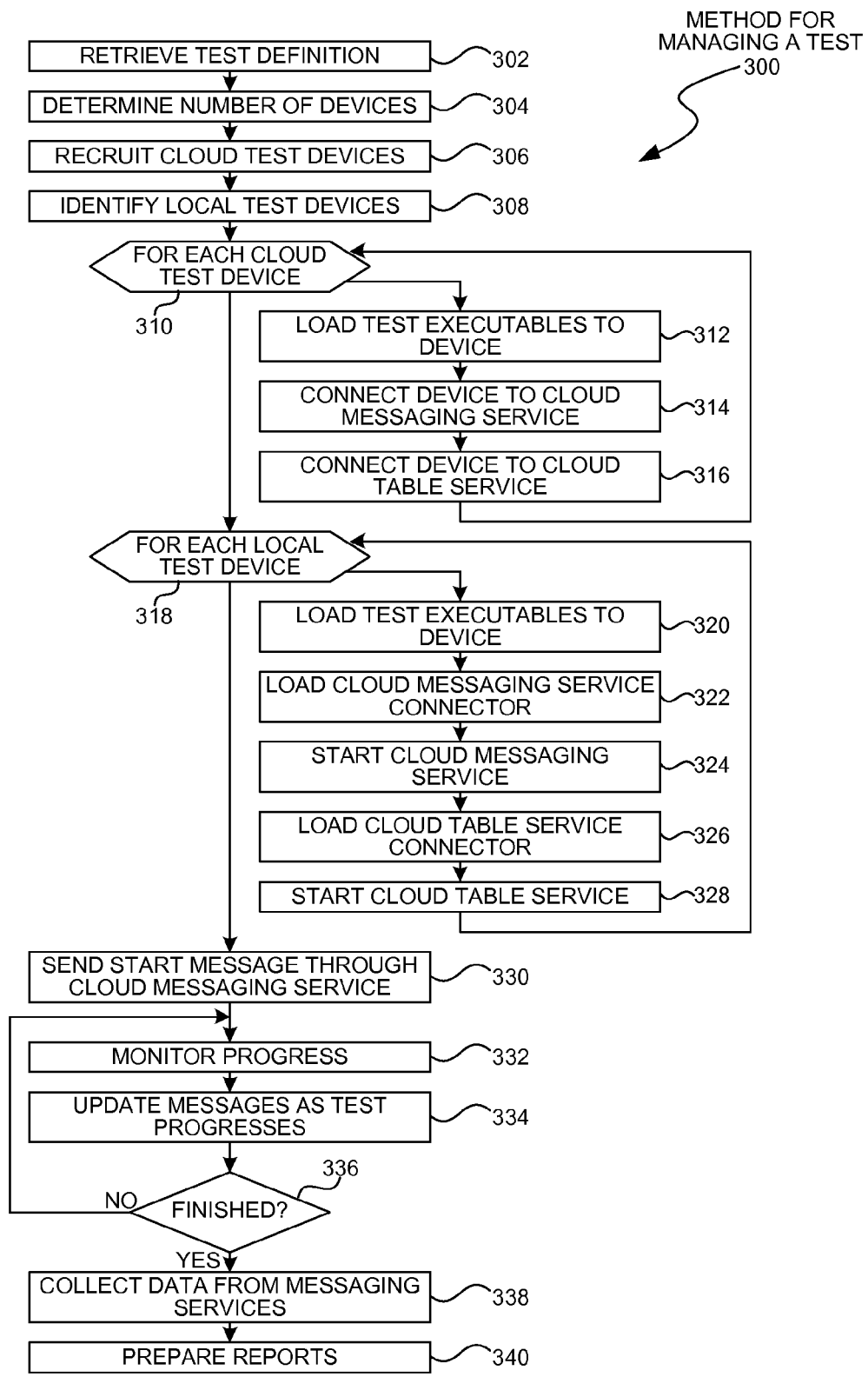
FIG. 3 is a flowchart illustration of an embodiment shop ng a method for deploying and executing a test scenario.

FIG. 3 is a flowchart illustration of an embodiment 300 showing a method for managing a test. The process of embodiment 300 is a simplified example of one method that may deploy and manage a test.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an example of the various steps that may be used to deploy and execute a test that uses both cloud resources and local resources to perform the test. In a typical use scenario, the test may exercise a large scale cloud application using the high bandwidth and large processing resources of cloud test devices along with configuration and security functions performed by local devices.

In block 302, a test definition may be received. The test definition may include test executables and test sequences.

The number of devices may be determined in block 304. The number of devices may include cloud resources and local resources that may be used to perform the entire test. In block 306, the cloud resources may be recruited, and local devices may be identified in block 308.

The recruitment of cloud resources may involve identifying the configurations of various cloud based virtual machines used for the test, and the number of each configuration. The recruitment step may include causing the test virtual machines to be instantiated and begin operation.

Each cloud device may be configured in block 310. For each device in block 310, the test executables for that device may be loaded in block 312. In some embodiments, a test agent may be installed to the virtual machine in bloc 312 and the test agent may download the test executables.

The cloud test device may be connected to a cloud messaging service in block 314 and to a cloud table service in block 316. Iii many cloud environments, the cloud messaging service and cloud table service may be standard components that are configured for a virtual machine in the cloud environment. As such, these services may be merely be configured for operation with the other test devices.

In block 318, each local test device may be configured. The configuration of the local test devices may be somewhat different than the cloud devices in that the local test devices may be connected to the various cloud services, such as the messaging and table services. Such cloud services may or may not be a standard service that is available on a local device.

For each device in block 318, the test executables for that device may be loaded in block 320. In some embodiments, a test agent may be installed to the local device in block 320 and the test agent may download the test executables.

A cloud messaging service connector may be loaded to the local device in block 322 and started in block 324. The cloud messaging service may enable the local device to communicate with other test devices using the cloud messaging service. The other devices may include other local devices as well as the virtual test devices.

Similarly, a cloud table service connection may be loaded to the local device in block 326 and started in block 328. The cloud table service may enable the local device to periodically update its status to the test management system in the same manner as cloud based test devices.

In block 330, a start message may be transmitted through the cloud messaging service to begin the test sequence.

In block 332, the test progress may be monitored. As the test progresses, an update message may be created in block 334. If the test is not finished in block 336, the process may return to block 332.

When the test finishes in block 336, data may be collected from the messaging services in block 338 and final reports may be generated in block 340.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a processor;
a test management system that:
    determines a list of available devices, said available devices comprising available cloud based devices and available non-cloud based devices;
    selects at least one available cloud based device;
    selects at least one available non-cloud based device;
    launches a test, said test being defined in a sequence of tasks, a first task being a task being performed by said non-cloud based device and a second task being performed by said cloud based device, said sequence of tasks being distributed by a messaging system, said messaging system being subscribed to by said non-cloud based device and said cloud based device;
    collects results from said non-cloud based device and said cloud based device; and
    displays said results.

2. The system of claim 1, wherein the result collection is performed by a data collection service, said data collection service subscribing to output from said non-cloud device and said cloud based device.

3. The system of claim 2, said test management system that further:
    identifies a plurality of devices;
    receives criteria for said plurality of devices; and presents a subset of said plurality of devices matching said criteria.

4. A system comprising:

a processor;

a test management system that:

determines a list of available devices, said available devices comprising available cloud based devices and available non-cloud based devices;

selects at least one available cloud based device;

selects at least one available non-cloud based device;

launches a test, said test being defined in a sequence of tasks, a first task being a task being performed by said non-cloud based device and a second task being performed by said cloud based device, said sequence of tasks being distributed by a messaging system, said messaging system being subscribed to by said non-cloud based device and said cloud based device;

collects results from said non-cloud based device and said cloud based device; and displays said results; and an installation system that:

connects to a first device, said first device being a non-cloud device;

causes said first device to be connected to a messaging service;

registers said first device as one of said available non-cloud devices; and makes said first device available as said non-cloud devices to said test management system.

5. The system of claim 4, said installation system that further:

downloads an agent to said first device, said agent connecting to said messaging service.

6. The system of claim 5, said messaging service being a cloud-based service.

7. The system of claim 6, said agent that further:

connects to a data collection service, said data collection service being a cloud-based service.

8. The system of claim 4, said installation system that further:

downloads authentication credentials to said first device, said authentication credentials authenticating said first device to perform cloud management operations.

9. The system of claim 8, said cloud management operations being operations incapable of being performed by a cloud based device.

10. The system of claim 9, said cloud management operations comprising changing an operational status of a cloud based device.

11. The system of claim 4, said first device being capable of address spoofing.

12. A method comprising:

defining a test sequence, said test sequence being a plurality of tasks, at least one task being performed by a cloud based device and at least one task being performed by a non-cloud based device;

selecting a first device being a cloud based device and a second device being a non-cloud based device to perform said test sequence;

transmitting said test sequence to a messaging service, said messaging service being subscribed to by said first device and said second device, said messaging service that transmits said tasks to subscribing devices;

receiving results from said first device and said second device through a data collection service; and presenting said results in a test report.

13. The method of claim 12, said messaging service and said data collection service being cloud based services.

14. The method of claim 13 further comprising:

installing an agent on said non-cloud based device, said agent connecting said non-cloud based device to said massaging service and said data collection service.

15. The method of claim 14 further comprising:

identifying a group of available devices by accessing said data collection service to retrieve identifiers for said first device and said second device.

16. The method of claim 15, said non-cloud device transmitting an identifier using said data collection service.

17. A system comprising:

a first connection to a first device being a cloud device;

a second connection to a second device being a non-cloud device;

a third connection to a messaging service that receives tasks and transmits said tasks to subscribers of said messaging service, said messaging service being a cloud service;

said first device having a first agent that subscribes to said messaging service;

said second device having a second agent that subscribes to said messaging service;

a test management system that:

receives a test sequence comprising a plurality of said tasks;

identifies said first device and said second device to perform said test sequence; and transmits said plurality of tasks to said first device and said second device through said messaging service.

18. The system of claim 17 further comprising:

a fourth connection to a data collection service that receives data from said first device and said second device.

19. The system of claim 18, said first agent and said second agent transmitting data to said data collection device.

20. The system of claim 17, said data collection service being a cloud-based service.

* * * * *